Oct. 20, 1931.  P. FERRIER  1,828,037
APPARATUS FOR THE MOLDING OF LONG OBJECTS BY CENTRIFUGAL TREATMENT
Filed Sept. 21, 1928  2 Sheets-Sheet 2
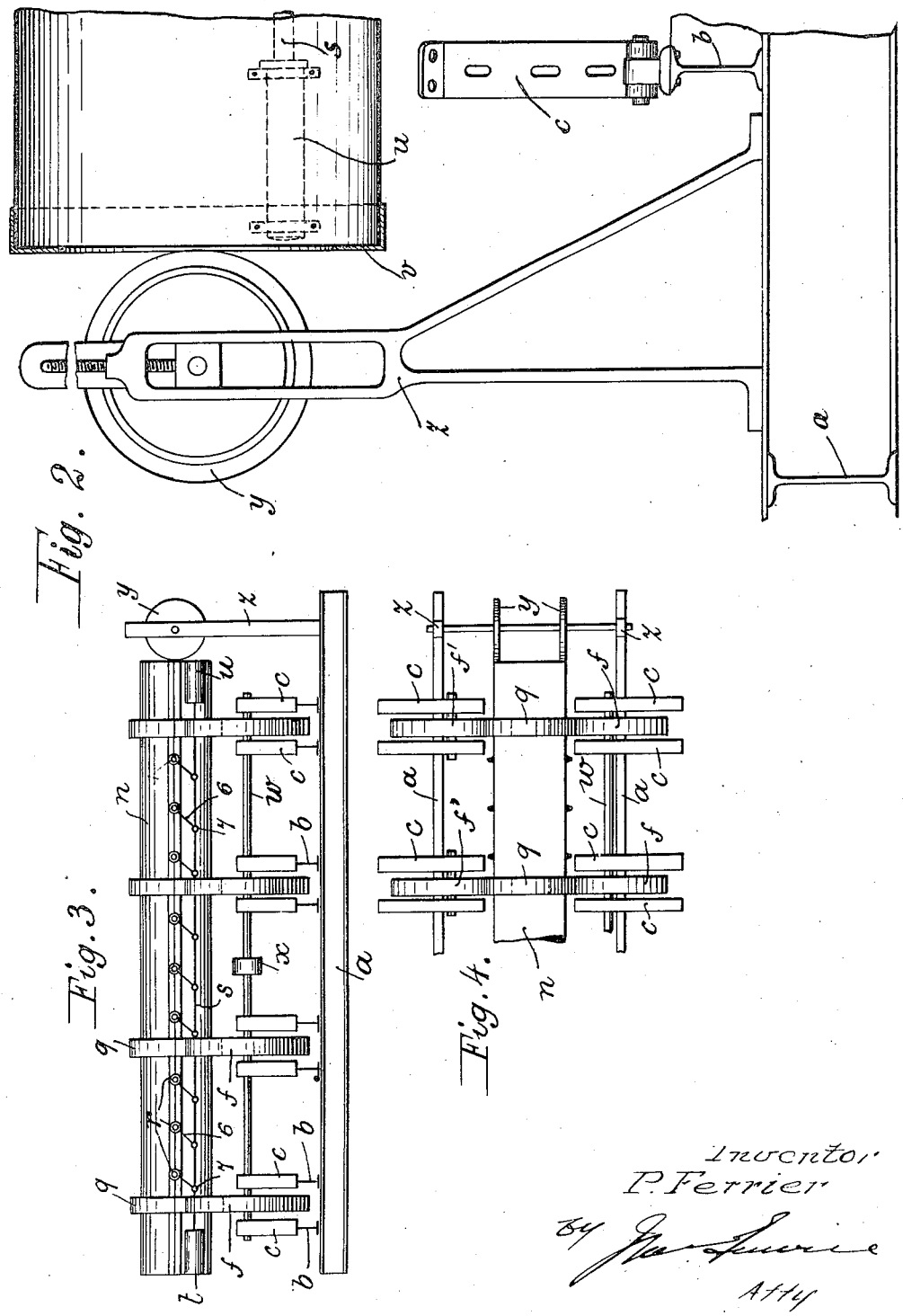

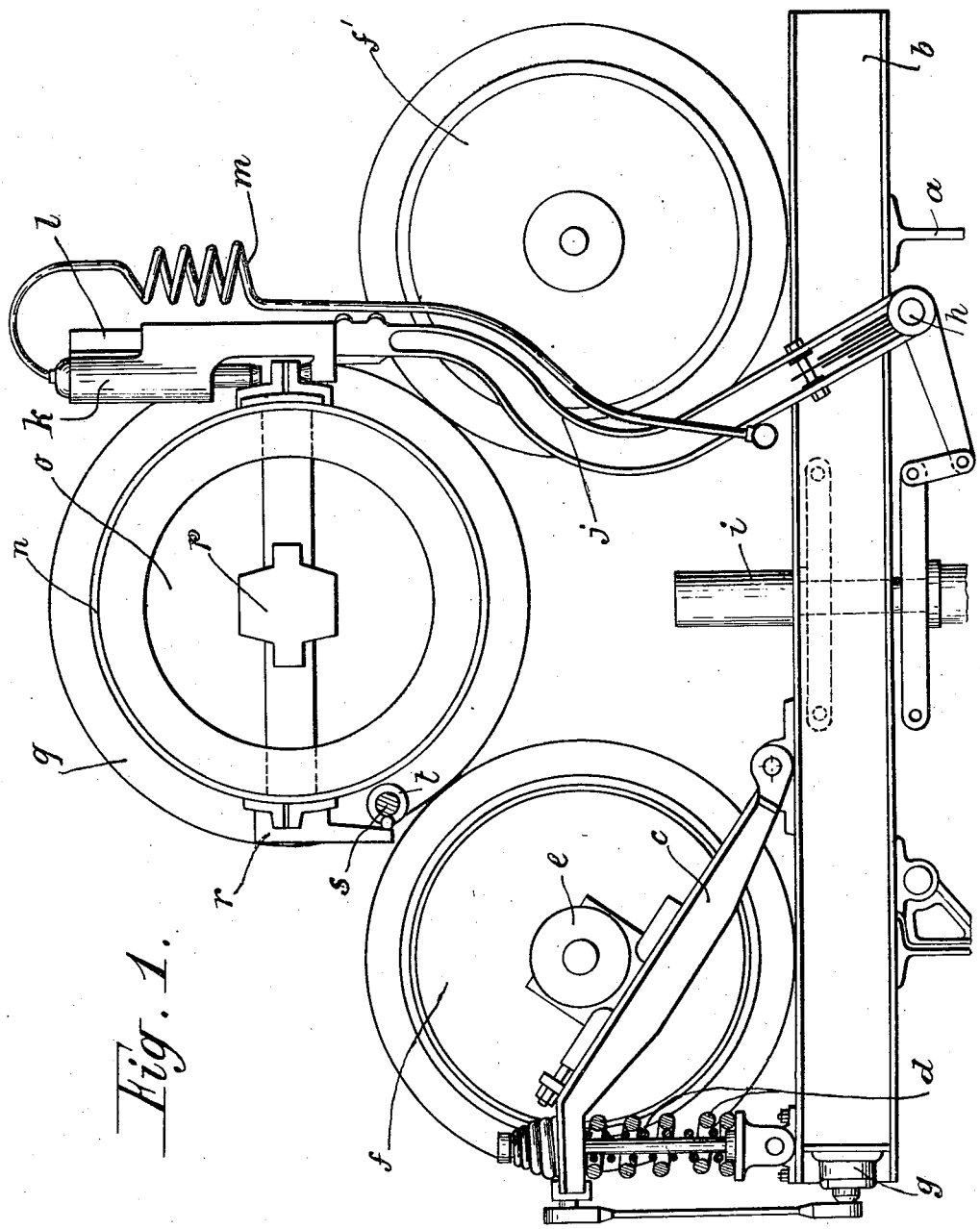

Patented Oct. 20, 1931                                                     1,828,037

UNITED STATES PATENT OFFICE

PAUL FERRIER, OF PARIS, FRANCE

APPARATUS FOR THE MOLDING OF LONG OBJECTS BY CENTRIFUGAL TREATMENT

Application filed September 21, 1928, Serial No. 307,467, and in France April 26, 1928.

The present invention relates to an apparatus for molding, by the centrifugal process, long and narrow objects which must be supported at more than two points during the rotation.

The present invention has for its object a centrifugal molding machine for molding elongated parts. The main feature of this improved machine consists in the provision of a frame carrying a plurality of pairs of rollers bearing the molds through more than two points of their length, the rollers disposed on one side of the frame serving to drive the molds to which they impart a rotary motion.

In the execution of the invention, the driving rollers are secured to a common shaft controlling them, or else they are driven independently through auxiliary control means.

The machine, according to the invention, shows moreover the following advantageous features:

1. The rollers are held in swivel ball bearings carried by shoes pivotally secured through one end to the frame, the other end being secured to a suitable yielding arrangement provided with a damping device.

2. Furthermore, a rigid cradle comprising two parts adapted to be rigidly bolted together is provided on its outer surface with a roller path or guideway adapted to move over the rollers of the frame and carries the yielding elongated molds.

The following description with reference to the appended drawings which are given by way of example shows various embodiments of the present invention.

Fig. 1 is an end view of the apparatus.

Fig. 2 is a partial lengthwise section.

Fig. 3 is a side view of the whole machine on a reduced scale.

Fig. 4 is a view from above of part of the machine shown in Fig. 3.

As shown in the drawings, the machine according to the present invention essentially comprises a main frame $a$ provided with cross-pieces $b$ and carrying the spaced-apart rollers $f$—$f'$ which are combined in a symmetrical disposition.

The rollers mounted on one side serve as driving rollers. They may be mounted upon a common shaft $w$ or may be actuated by independent means by suitable driving gear, as a driving pulley $x$. In these conditions, if the mold provided with its wheels engaging the rollers $f$—$f'$ were perfectly regular, rigid and centered on the said rollers, it would rotate in a circular manner and the machine would well operate. However, in the actual circumstances, the mold which had a regular form when new, will become rapidly distorted after use, and the said wheels, whether centered or not, will form eccentrics which cause shocks upon the rollers, even if the latter have rubber tires, and the resulting shocks will cause strains on the various parts, whence a defective apparatus will result.

To obviate these defects, the bearings $e$ of the rollers $f$—$f'$ are mounted on the machine by means of the base plates $c$ pivoted at one end, the other end depending upon an elastic arrangement comprising a spring $d$. The plates $c$ are inclined in such manner that the motion of the said rollers will be practically perpendicular to the tangent at the contact, in order to reduce the amount of their motion. The said parts are adjustable, and the pivoting motion of the plates $c$ is reduced by the shock absorbers $g$ secured to the cross-pieces $b$. The bearings $e$ are of the ball-bearing and the ball-and-socket type, to provide for the relative motion, and the diameter of the shaft, if it is common, is such that it will afford a sufficient flexion without danger, or otherwise it would be necessary to utilize auxiliary shafts, or a common shaft comprising several sections connected together by Cardan joints.

The elasticity thus obtained will permit the manufacture of molded pieces of good quality with the use of molds which are irregular or are badly centered, provided they are sufficiently rigid.

For the manufacture of tapered pieces, the molds are inclined, and are thus arrested at the end by a fixed stop; the rod of the said stop is capable of pivotation in order to follow the movements of the mold, but if the latter is flexible and also irregular, the eccentricity will become too great, and it will be necessary to increase the rigidity of the mold.

In this case I employ a counter-mold or cradle $n$ carrying the removable spacing pieces $o$ of the mold $p$, which provides for the insertion of different molds and for their centering, the inertia of the said cradle being greater than that of the mold. The peripheral part of the said cradle is thus supported by the wheels $q$ suitably spaced thereon.

When provided with a counter-mold, the said machine comprises a device by which the latter may be closed. For this purpose I place at suitable points on the cradle $n$, the rotating catches $r$ controlled by the rod $s$ actuated by hydraulic presses, $t$ for the closing and $u$ for the opening, to which the water under pressure is supplied by a flexible hose with a quick coupling device.

The rotating catches $r$ cannot bring the two halves of the counter-mold together; the said halves are brought together by the auxiliary hydraulic presses $k$ disposed along the machine and supplied by the hose $m$.

The closing presses $k$ are mounted on an arm $j$ and are actuated by a shaft $h$ subjected to a hydraulic control $i$.

A sliding member $l$ allows the press $k$ to automatically regulate itself to the proper height for the closing of the said cradle, according to the downward motion of the elastic supporting system consisting of the plates $c$ and the springs $d$.

The end of the said cradle is provided with a flange $v$ and is in contact with one or more thrust rollers $y$ which limit its motion and whose height is adjustable upon an auxiliary frame or support mounted on the main frame.

The construction of the apparatus as above specified corresponds to a certain number of results thereby obtained, which form the characteristic features of the operation of the machine, as follows:

A mold which is accurately centered and is held rigidly in the straight position when in rotation.

A molded piece which is also well centered and has a regular thickness, even in a mold which is flexible and not very straight.

A rigid apparatus whose speed of rotation can be increased without danger of attaining the critical speed of the whipping of the mold.

In this case the centrifugal motion will have its maximum effect due to the speed employed.

Since the said cradle is an apparatus adapted for a purely mechanical functioning, it may be provided with closing means of a more or less automatic nature; the mold has its tight closing arrangement, and much time will thus be saved.

The said cradle further protects all of the external mechanisms against the splashing of water containing more or less cement, which is discharged from the mold, whence the cost of maintenance will be reduced. The interior of the said cradle contains no mechanical parts, and can thus be readily cleaned and lubricated so as to prevent all adhesion.

For the molding of tapered pieces, the whole machine may be inclined towards the point, and the flange which is pressed against the said rollers will also prevent the splashing of the liquid.

The entire machine can be utilized not only for the centrifugal treatment of concrete but also for the like treatment of long pieces of metal molded by centrifugal action, with dead molds or not.

Obviously, the said arrangements are given solely by way of example, and the forms, material and dimensions of the several parts as well as the details are susceptible of various modifications without departing from the spirit of the invention.

I claim:

1. A centrifugal molding machine for molding elongated parts comprising a frame provided with several pairs of yieldingly mounted rollers carrying the molds through more than two points of their length, the rollers disposed on one side on the frame being driving rollers and imparting a rotary motion to the molds.

2. A centrifugal molding machine according to claim 1 wherein the driving rollers are borne by a common shaft and are caused to rotate through this shaft.

3. A centrifugal molding machine according to claim 1 wherein the driving rollers are secured to independent shafts and are actuated through auxiliary transmissions which are also independent.

4. A centrifugal molding machine according to claim 1 wherein the rollers are carried in swivel ball bearings, supported by shoes pivotally secured to the frame through one end and carried at their other end by a yielding arrangement provided with a damping device.

5. A centrifugal molding machine according to claim 1 wherein a rigid cradle in two parts is provided with mechanical closing means and formed on its outer surface with roller paths cooperating with the rollers on the frame to receive the long and yielding molds.

In testimony whereof I affix my signature.

PAUL FERRIER.